US007212916B2

(12) United States Patent
Alewine et al.

(10) Patent No.: US 7,212,916 B2
(45) Date of Patent: May 1, 2007

(54) OBTAINING CONTEXTUAL VEHICLE INFORMATION

(75) Inventors: Neal J. Alewine, Lake Worth, FL (US); Jonathan L. Gabel, Charlotte, NC (US); Joseph G. Rusnak, Durham, NC (US); Anthony W. Wrobel, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 11/011,628

(22) Filed: Dec. 14, 2004

(65) Prior Publication Data

US 2006/0129283 A1 Jun. 15, 2006

(51) Int. Cl.
*G06F 17/00* (2006.01)

(52) U.S. Cl. ........................................ 701/117; 701/33

(58) Field of Classification Search ..................... None
See application file for complete search history.

(56) References Cited

U.S. PATENT DOCUMENTS 5,023,798 A 6/1991 Neukirchner et al.
5,732,074 A 3/1998 Spaur et al.
5,732,383 A 3/1998 Foladare et al.
5,838,277 A 11/1998 Loomis et al.
5,983,156 A 11/1999 Andrews
6,006,160 A 12/1999 Tamaki et al.
6,023,654 A 2/2000 Mohlenkamp
6,169,515 B1 1/2001 Mannings et al.
6,339,745 B1 1/2002 Novik
6,380,890 B1 4/2002 Smith et al.
6,389,337 B1 5/2002 Kolls
6,421,608 B1 7/2002 Motoyama et al.
6,429,773 B1 * 8/2002 Schuyler .................. 340/425.5
6,456,234 B1 9/2002 Johnson
6,489,146 B2 12/2002 Stemmer et al.
6,490,519 B1 12/2002 Lapidot et al.

(Continued)

FOREIGN PATENT DOCUMENTS

DE 19744602 4/1998

(Continued)

OTHER PUBLICATIONS

Liu, J.W.S., "Distributed Routing and Relay Management in Mobile Packet Radio Networks", Proc. of Distributed Computing, COMPSON 80, IEEE, pp. 235-243, (1980).

*Primary Examiner*—Michael J. Zanelli
(74) *Attorney, Agent, or Firm*—Akerman Senterfitt

(57) ABSTRACT

A system for permitting remotely located applications to obtain information about vehicle conditions and responsively perform programmatic actions based upon the vehicle conditions. The system can include a vehicle response server and a vehicle response agent. The vehicle response server can manage communications between one or more vehicles and at least one application remotely located from the vehicles. The application can automatically execute at least one context-dependent programmatic action based upon an event occurrence triggered by vehicle sensor input. The vehicle response agent, which resides within the vehicle can receive an activation context that specifies conditions for the event occurrence. The vehicle response agent can then monitor the vehicle for the event occurrence and, when appropriate, wirelessly convey an indication of the event occurrence to the vehicle response server. The indication can result in the automatic execution of the at least one context-dependent programmatic action.

19 Claims, 5 Drawing Sheets

U.S. PATENT DOCUMENTS

| | | | | |
|---|---|---|---|---|
| 6,509,830 | B1 | 1/2003 | Elliott | |
| 6,529,141 | B1 * | 3/2003 | Hanebeck et al. | 340/988 |
| 6,611,686 | B1 * | 8/2003 | Smith et al. | 340/990 |
| 6,778,888 | B2 * | 8/2004 | Cataldo et al. | 701/29 |
| 6,944,679 | B2 * | 9/2005 | Parupudi et al. | 709/246 |
| 7,035,731 | B2 * | 4/2006 | Smith | 701/207 |
| 2001/0029425 | A1 | 10/2001 | Myr | |
| 2002/0032517 | A1 | 3/2002 | Buckelew et al. | |
| 2002/0049538 | A1 | 4/2002 | Knapton et al. | |
| 2002/0087260 | A1 | 7/2002 | Hancock et al. | |
| 2002/0137489 | A1 | 9/2002 | Dutta et al. | |
| 2002/0158778 | A1 | 10/2002 | Flick | |
| 2003/0006913 | A1 | 1/2003 | Joyce et al. | |
| 2003/0055555 | A1 | 3/2003 | Knockeart et al. | |
| 2003/0060968 | A1 | 3/2003 | MacPhail et al. | |
| 2004/0093291 | A1 | 5/2004 | Bodin | |

FOREIGN PATENT DOCUMENTS

| | | |
|---|---|---|
| DE | 10128873 | 12/2002 |

* cited by examiner

200

| Data Item | ID | Units | Comments |
|---|---|---|---|
| Vehicle ID | ID | String | The vehicle's ID. This variable is useful for specification in the "Values required" list for requests where multiple vehicles might match and be returned. |
| Time | TIME | Time Value | The time to be used for expression evaluation. |
| Longitude | LONG | Degrees | The GPS-supplied longitude of the vehicle. |
| Latitude | LAT | Degrees | The GPS-supplied latitude of the vehicle. |
| Speed | SPEED | MPH/KPH | Vehicle speed at current location. Units should be configurable. |
| Odometer | ODO | Miles/Kilometers | Units should be configurable. |
| Direction | DIR | Degrees | Compass bearing at current location. |
| Engine Oil Level | OIL | Quarts/Liters | Units should be configurable. |
| Engine Temperature | TEMP | Degrees (F/C) | Temperature scale should be configurable. |
| Engine Tachometer | TACH | RPMs | |
| Tank Fuel Level | FUEL | Gallons/Liters | Units should be configurable. |
| Wiper Setting | WIPER | A setting number | A number corresponding to the current setting of the windshield wipers (off, low, medium, high, etc.). |

FIG. 2

300

| Comparison Operator | Meaning |
|---|---|
| = | Equals |
| < | Less than |
| > | Greater than |
| <= | Less than or equals |
| >= | Greater than or equals |
| <> | Not equals |
| ! | Not (negation) |

FIG. 3

400

| Function | Operand(s) | Purpose/return value |
|---|---|---|
| DistanceTo | 2-way location vector (longitude, latitude) | Returns the current distance (in meters) from the input location vector. |
| GridLocation | Start longitude, longitude division, end longitude, start latitude, latitude division, end latitude | Returns an integral grid sector identifier for the location grid defined by the input parameters. |
| Change | Output-Data Monitoring Value ID or built-in function | Returns the value(positive/negative) the input variable has changed since the last time checked. The initial baseline value is recorded at the time the form is received by the Agent, and is updated each time a response is sent to the Server. |
| PercentChange | Output-Data Monitoring Value ID or built-in function | Returns the value (positive/negative) the input variable has changed as a percentage since the last time checked. The initial baseline value is recorded at the time the form is received by the Agent, and is updated each time a response is sent to the Server. |

FIG. 4

OBTAINING CONTEXTUAL VEHICLE INFORMATION

BACKGROUND

1. Field of the Invention

The present invention relates to the fields of computer software and networking and, more particularly, to a technique through which applications can obtain contextual vehicle information.

2. Description of the Related Art

Most vehicles include a multitude of sensors that produce output, which can be presented to a vehicle driver to inform the driver of a condition pertaining to the vehicle. Sensors can indicate, for example, fuel level, oil pressure, engine temperature, vehicle speed, battery charge, and the like. Other vehicle sensors, such as a thermometer, a compass, and a Global Positioning System (GPS), can indicate an environmental state surrounding the vehicle.

Many remote applications would benefit from receiving vehicle input, and being able to take programmatic actions responsive to this input. For example, a gas station application may want to present a coupon to a customer low on gas when approaching an associated gas station. In another example, a parent may want to monitor the fluid levels and warning indicators on a parent-owned vehicle used by a teenager.

Conventional technologies, however, have failed to overcome difficulties associated with remote applications utilizing contextual information from vehicles. One technical difficulty relates to communications between several mobile vehicles and several remote applications hosted at a fixed location. While wireless communications are possible with a vehicle using methodologies such as those used for mobile telephony and vehicle GPS, these methodologies generally require either a constant communication connection or periodic status polling/status response messages to be conveyed between each vehicle and each remote application. Such communication methodologies are designed for point-to-point information exchanges and do not provide easily scalable solutions capable of being ported to vehicle/application communications. That is, when the number of remote applications and the number of vehicles grow, communications complexity and cost can grow geometrically.

One sociological difficulty in permitting remote applications to obtain contextual vehicle information pertains to driver privacy and safety. Vehicle contextual information can be used to track a driver's location, habits, and routines to an extent that makes many drivers extremely uncomfortable. Further, companies providing access to the vehicle contextual information can have liability and customer relation concerns when using unsecured information conveyance techniques. What is needed is a scalable, cost efficient, and secure technology for permitting remotely located applications to obtain contextual vehicle information.

SUMMARY OF THE INVENTION

One aspect of the present invention can include a system for permitting remotely located applications to obtain information about vehicle conditions and responsively perform programmatic actions based upon the vehicle conditions/context. The system can include a vehicle response server and a vehicle response agent. The vehicle response server can manage communications between one or more vehicles and at least one application that is remotely located from each vehicle. The application can automatically execute at least one context-dependent programmatic action based upon an event occurrence triggered by vehicle sensor input. The vehicle response agent, which resides within the vehicle, can receive an activation context that specifies conditions for the event occurrence. The vehicle response agent can then monitor the vehicle for the event occurrence and, when appropriate, wirelessly convey an indication of the event occurrence to the vehicle response server. The indication can result in the automatic execution of the at least one context-dependent programmatic action at the remote location.

Another aspect of the present invention can include a method for obtaining contextual vehicle information. The method can include the step of conveying an activation context from a remote computing device to an in-vehicle device. The activation context can be associated with at least one context-dependent programmatic action. The in-vehicle device can determine an occurrence of a context event specified by the activation context. Responsive to the occurrence, a context indication can be conveyed to the remote computing device, where the context indication can cause the context-dependent programmatic action to execute. The vehicle and the remote computing device can be communicatively linked through a wireless network.

It should be noted that the invention can be implemented as a program for a controlling computer to implement the functions described herein, or as a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown herein.

FIG. 2 is a table including several data items that can be used by a vehicle response language in accordance with an embodiment of the inventive arrangements disclosed herein.

FIG. 3 is a table including comparison operators that can be used by a vehicle response language in accordance with an embodiment of the inventive arrangements disclosed herein.

FIG. 4 is a table including several vehicle response language functions in accordance with an embodiment of the inventive arrangements disclosed herein.

DETAILED DESCRIPTION OF THE INVENTION

Figure 1:
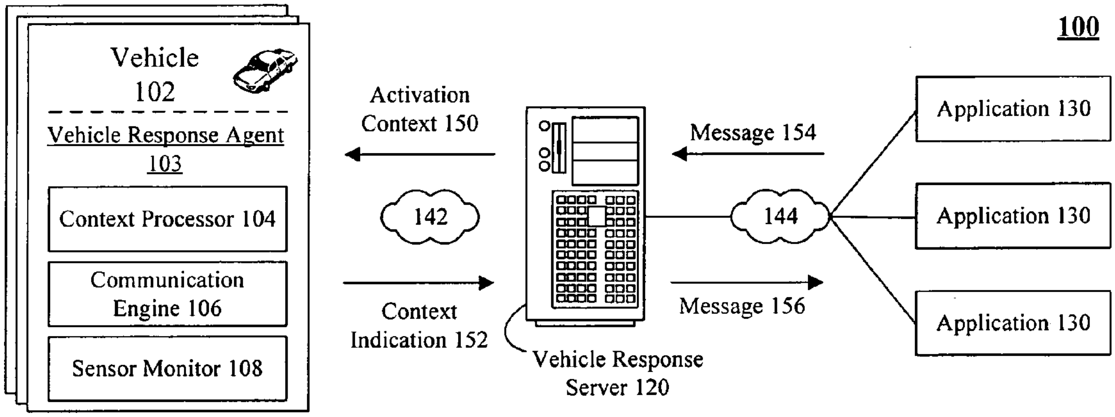
FIG. 1 is a schematic diagram illustrating a system in which applications can obtain and utilize vehicle context information in accordance with an embodiment of the inventive arrangements disclosed herein.

FIG. 1 is a schematic diagram illustrating a system 100 in which applications can obtain and utilize vehicle context information in accordance with an embodiment of the inventive arrangements disclosed herein. System 100 can include at least one vehicle 102, a vehicle response server 120, and one or more applications 130.

The vehicle 102 can be any device in, upon, or by which a person or property is or may be transported or drawn upon a highway, excepting devices moved by human power or used exclusively upon rails or tracks. For example, the vehicle 102 can include an automobile, truck, van, motorcycle, moped, recreational vehicle (RV), and other such transportation devices.

The vehicle 102 can include an in-vehicle device within which a vehicle response agent 103 resides. The vehicle response agent 103 can include a machine-readable set of programmatic instructions configured to receive an activation context 150 from the vehicle response server 120, extract conditions from the activation context 150 to generate at least one monitored vehicle-specific event, to monitor for the event occurrence, and to wirelessly convey an indication of the event, which can be referred to as a context indication 152, to the vehicle response server 120.

In one embodiment, the vehicle response agent 103 can include a context processor 104, a communication engine 106, and a sensor monitor 108. The context processor 104 can translate one or more activation contexts 150 into one or more vehicle-specific events. That is, the context processor 104 can place generic vehicle agnostic queries into a vehicle-specific context. The context processor 104 can then monitor input from various sensors through the sensor monitor 108 of the vehicle 102 to determine if the vehicle-specific events occur. When the events do occur, the vehicle response agent 103 can take one or more actions specified within the activation context 150. For example, the vehicle response agent 103 can convey the context indication 152 to the vehicle response server 120.

The communication engine 106 can establish a communication link across network 142 with the vehicle response server 120 through which digitally encoded information can be conveyed, such as the activation context 150 and the context indication 152. The network 142 can be any wireless network, including, but not limited to one or more wireless local area networks, a satellite network, a radio network, a mobile telephony network, and the like.

The sensor monitor 108 can be a memory and processing unit configured to receive vehicle sensor input. The sensor monitor 108 can correlate the vehicle sensor input into vehicle specific conditions, which in turn can activate the vehicle specific events established by the context processor 104. Sensor monitor 108 can include any of a variety of sensors including, but not limited to, fluid level sensors, temperature sensors, air pressure sensors, navigational sensors, speed and distance sensors, and other sensors that measure vehicle-specific values.

The sensor monitor 108 can be linked to a vehicle's computer control module, a Global Positioning System (GPS), a mobile telephony system, electronic controls such as powered windows, and other in-vehicle systems. Additionally, sensors not typically included within vehicle 102 can be added to the vehicle 102 to provide input for the sensor monitor 108. For example, a barometer can be added to the vehicle 102 to provide environmental input to one or more weather-based applications 130. In another example, a pre-paid toll sensor/transceiver can be added to the vehicle 102 to record/transmit information to toll-related applications 130.

The vehicle response server 120 can be any computing device that manages communications between at least one vehicle 102 and at least one application 130 remotely located from the vehicle 102. The vehicle response server 120 can consolidate requests from the various applications 130 so that the vehicle 102 does not receive a series of redundant information requests. The vehicle response server 120 can also include security and authentication routines to ensure that only those application requests 130 approved by the vehicle 102 owner are conveyed to the vehicle. Consequently, the vehicle response server 120 can function as a firewall that only permits approved and sanitized information to be conveyed to the vehicle response agent 103, where sanitation can check messages for viruses and other malicious software before the approved messages are conveyed to the vehicle 102.

In one embodiment, the vehicle response server 120 can represent a single server or network element. The vehicle response server 120 can also be a logical entity consisting of a multitude of geographically distributed hardware components that are communicatively linked to one another via a network.

Each application 130 can include a set of machine-readable instructions designed to perform a specific instruction. Application 130 can include one program or a group of programs that are designed to automatically execute at least one context-dependent programmatic action based upon an event occurrence within vehicle 102. Application 130 can be an application hosted by the vehicle response server 120 and/or can be an application remotely located and functionally independent of the vehicle response server 120.

Each application 130 can convey a message 154 to the vehicle response server 120 that indicates a set of conditions for triggering the context dependent programmatic action. The vehicle response server 120 can trigger the context dependent action via message 156, which can include any and all parameters needed by the application 130, such as vehicle specific values derived from a sensor or data store accessible to the vehicle response server 120.

Each application 130 can be linked to the vehicle response server 120 through a network 144. The network 144 can represent any communication mechanism capable of conveying digitally encoded information. More specifically, the network 144 can include a computer network such as a Local Area Network (LAN) or a Wide Area Network (WAN), a telephony network such as a Public Switched Telephony Network (PSTN) or a mobile telephony network, a cable network, a satellite network, a broadcast network, and the like. The network 144 can use wireless as well as line-based communication pathways.

Further, the network 144, as well as the network 142, can encode information in accordance with any communication protocol, such as a packet-based communication protocol or a circuit based communication protocol. Networks 142 and 144 can also convey information in a secure fashion, where conveyed information can be encrypted before transmittal, thereby requiring an information recipient to utilize a corresponding decryption key (password, certificate, public key, private key) to access the conveyed information in a comprehensible fashion.

In one contemplated arrangement, the vehicle response agent 103, the vehicle response server 120, the application 130, and combinations thereof can communicate using messages written in a defined vehicle response language that includes data types and functions specifically defined for obtaining and processing vehicle context information.

FIG. 2 is a table 200 including several data items that can be used by a vehicle response language in accordance with an embodiment of the inventive arrangements disclosed herein. Table 200 can include, but is not limited to data items for vehicle identification, time, longitude, latitude, speed, odometer, direction, engine oil level, engine temperature, engine tachometer, tank fuel level, and wiper settings. Each data item has an associated short identifier, a unit type, and a brief description.

As shown in table 200, Vehicle ID has a short identifier of ID, can be a string value, and can uniquely define a vehicle. Time has a short identifier of TIME, can be a time value, and can be used for expression evaluation. Longitude has a short identifier of LONG, can have a unit type of degrees, and can be a GPS supplied longitude value for a vehicle. Latitude has a short identifier of LAT, can have a unit type of degrees, and can be a GPS supplied latitude value for a vehicle. Speed has a short identifier of SPEED, can have a unit type of miles per hour or kilometers per hour, and can represent a current vehicle speed. Odometer has a short identifier of ODO, can have a unit type of miles or kilometers, and can represent a vehicle's permanent or trip odometer value. Direction has a short identifier of DIR, can have a unit type of degrees, and can represent a compass bearing of the vehicle. Engine Oil Level has a short identifier of OIL, can have a unit type of quarts or liters, and can represent a level of oil for a vehicle. Engine Temperature has a short identifier of TEMP, can have a unit type of degrees Fahrenheit or Celsius, and can specify an engine temperature. Engine Tachometer has a short identifier of TACH, can have a unit type of revolutions per minute, and can be a tachometer value for the vehicle. Tank Fuel Level has a short identifier of FUEL, can have a unit type of gallons or liters, and can signify how much gas is currently in a vehicle's tank. Wiper Setting has a short identifier of WIPER, can have a unit type of setting level, and can correspond to the current setting of the windshield wipers of a vehicle.

It should be appreciated that the data types of table 200 are not intended as an exhaustive list of data types for the vehicle response language, and that other similar data types are contemplated herein. For example, data types for headlamp setting, battery charge, tire pressure, exterior temperature, turn signals, radio station, radio volume, seat position, window setting, rear view mirror adjustment, and other vehicle specific data types can be included in the vehicle response language.

It should also be appreciated that the data types of table 200 can be used not only to obtain current vehicle conditions but may also be used to remotely adjust these conditions. For example, an authorized remote application can use vehicle response language data types to close a window or lock a door of a vehicle that has been stationary for a predetermined period.

FIG. 3 is a table 300 including comparison operators that can be used by a vehicle response language in accordance with an embodiment of the inventive arrangements disclosed herein. The comparison operators can include operators for EQUALS, LESS THAN, GREATER THAN, LESS THAN OR EQUAL TO, GREATER THAN OR EQUAL TO, NOT EQUAL, and NOT. The vehicle response language is not limited to these comparison operators, and other operators can be utilized. For example, a SYNONYM operator (not shown) can be utilized by the vehicle response language.

In addition to the comparison operators, logical operators including, but not limited to, AND, OR, XOR, and NOT can be used to form logical expressions. Arithmetic functions can also be used to mathematically manipulate compatible numeric data types. It should be appreciated that expressions can be nested, parenthetically grouped, and negated. Further, the order of operation processing and nesting robustness can be configured by design implementers to suit programming needs for which the vehicle response language is intended to satisfy.

FIG. 4 is a table 400 including several vehicle response language functions in accordance with an embodiment of the inventive arrangements disclosed herein. The functions can include, but are not limited to, a DistanceTo function, a GridLocation function, a Change function, and a PercentChange function, each having defined operands and return values.

The DistanceTo function can have a two-way location vector operand and can return a distance. The GridLocation function can have operands for start longitude, longitude division, end longitude, start latitude, latitude division, and end latitude. GridLocation can return an integral grid sector identifier for location grid. Change can have an input parameter of varying type and can return a positive/negative value indicating a change in the input parameter since a designated time, which can be the last time the Change function was called. PercentChange can be similar to Change, except the return value is expressed as a percentage.

It should be appreciated that the functions of the vehicle response language are not to be limited to those shown in table 400 and that any of a variety of other functions are contemplated herein. For example, the vehicle response language can include functions for remotely adjusting a data type to a user-established setting, obtaining a data type value, presenting a notification to a driver, and other such functions.

Figure 5:
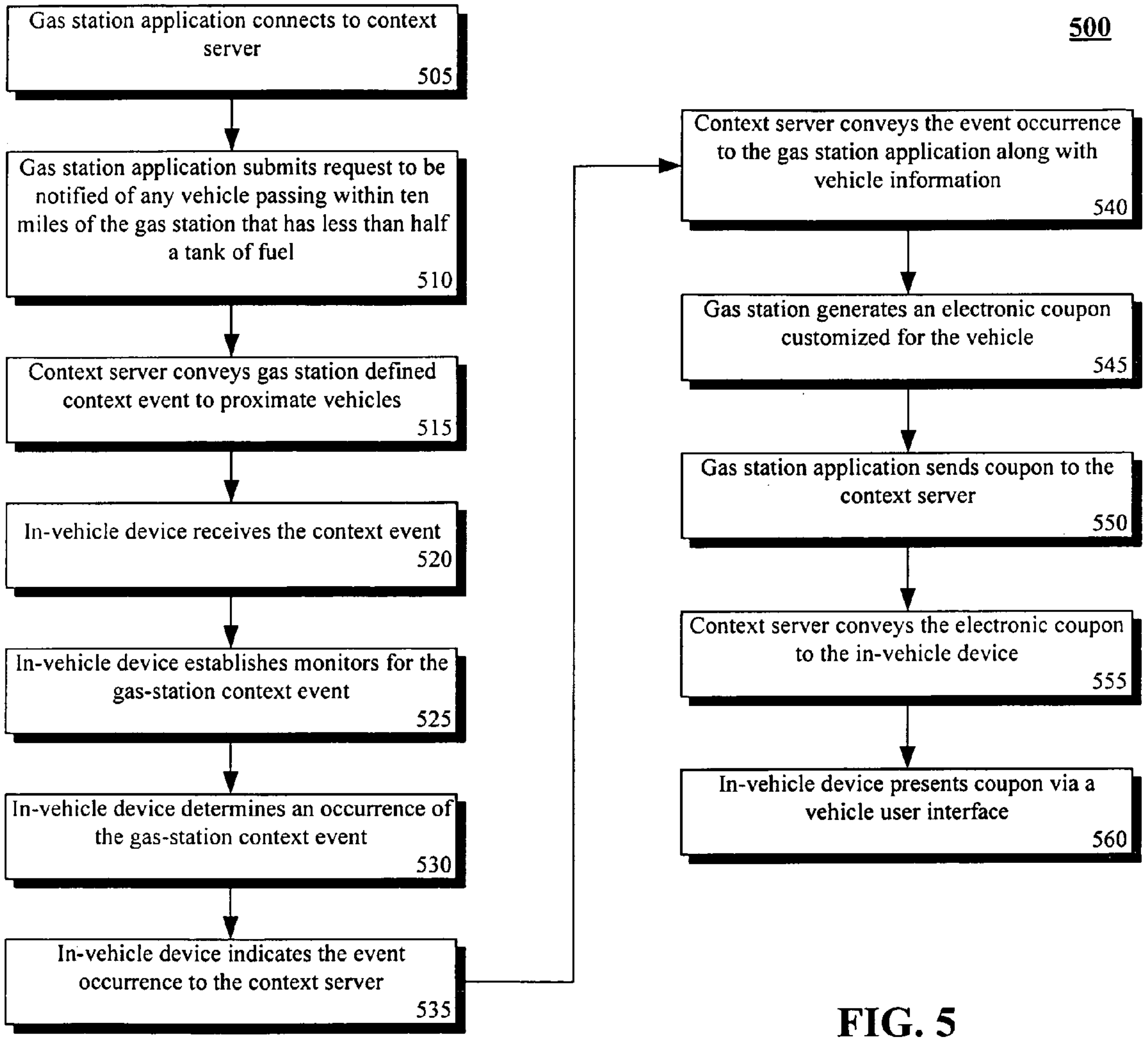
FIG. 5 is a flow chart of an interaction between a gas station and a vehicle in accordance with an embodiment of the inventive arrangements disclosed herein.

FIG. 5 is a flow chart of an interaction 500 between a gas station application and a vehicle in accordance with an embodiment of the inventive arrangements disclosed herein. The interaction 500 can be performed in the context of a vehicle communication system, such as the system 100 of FIG. 1.

Interaction 500 can begin in step 505, where a gas station application can connect with a context server, which in one embodiment can include a vehicle response server 120 of FIG. 1. In step 510, the gas station application can submit a request to be notified when any vehicle that has less than half a tank of fuel passes within ten miles of a designated gas station. In step 515, the context server can convey the gas station defined context event (within ten miles having less than half a tank of fuel) to one or more proximate vehicles.

In one embodiment, a proximate vehicle can include any vehicle within a communication range of the context server or a transceiver controlled by the context server. In another embodiment, the proximate vehicle can refer to any vehicle a predefined distance from the gas station. For example, a proximate vehicle can be any vehicle within 15 miles of a gas station traveling in the general direction of the gas station. In another example, the gas station can reside within a defined grid, and a proximate vehicle can be any vehicle traveling within that grid.

In step 520, an in-vehicle device can receive the context event from the context server. In one embodiment, the in-vehicle device can include the vehicle response agent 103 of FIG. 1. In step 525, the in-vehicle device can monitor for the gas station event. In step 530, the in-vehicle device can determine that the gas station event has occurred (within ten miles and having less than half a tank of gas). In step 535, the in-vehicle device can indicate the event occurrence to the context server. In step 540, the context server can convey the event occurrence to the gas station application. The context server can also convey additional vehicle information to the gas station application. The additional information can be obtained from the in-vehicle device or from a data store pertaining to the vehicle that is maintained by the context server.

In step 545, the gas station application can generate an electronic coupon customized for the vehicle. In step 550, the gas station application can send the coupon to the context server. In step 555, the context server can convey the electronic coupon to the in-vehicle device. In step 560, the in-vehicle device can present the coupon to a driver via a vehicle user interface.

In one embodiment, the interaction 500 can utilize a vehicle response language having characteristics like those presented in FIGS. 2, 3, and 4. In such an embodiment, the in-vehicle device can use the following pseudo code routine to detect the event of passing within 10 miles of a gas station when the vehicle has less than half a tank of fuel. The event triggers the conveyance of the vehicle ID and Tank Fuel Level to the context server.

```
IF Fuel <0.5 tank AND
DistanceTo(gas station longitude coordinate, gas station
    latitude coordinate) <10 miles THEN
RETURN Vehicle ID
RETURN Tank Fuel Level
END IF
```

Figure 6:
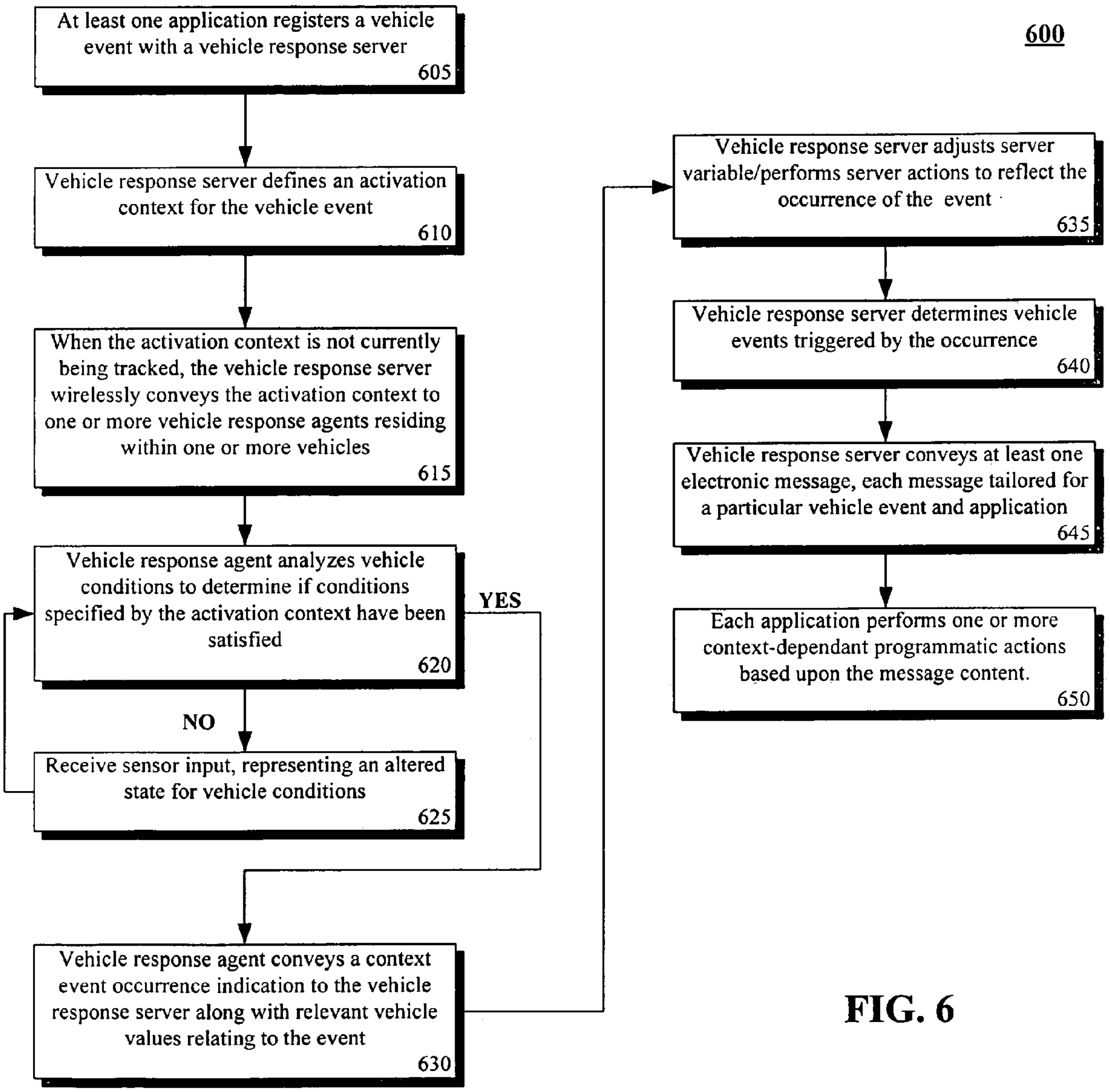
FIG. 6 is a flow chart of a method for obtaining vehicle context information to be used by one or more applications in accordance with an embodiment of the inventive arrangements disclosed herein.

FIG. 6 is a flow chart of a method 600 for obtaining vehicle context information to be used by one or more applications in accordance with an embodiment of the inventive arrangements disclosed herein. The method 600 can be performed in the context of-a vehicle communication system, such as the system 100 of FIG. 1. In one embodiment, the method can utilize a vehicle response language having characteristics like those presented in FIGS. 2, 3, and 4. Method 600 is not limited in this regard and can be performed in the context of any system including one or more vehicles and at least one server wirelessly connected to the vehicles. Likewise, the steps in method 600 can be implemented in any programming language and is not limited to any particular vehicle response language.

Method 600 can begin in step 605 where at least one application can register a vehicle event with a vehicle response server. A vehicle event can be any event dependant upon a condition occurring within a vehicle that is unique to the vehicle. Consequently, a vehicle event is determined within the context of a specific vehicle.

In step 610, the vehicle response server can define an activation context for the vehicle event. The activation context need not be identical to the vehicle event. In one embodiment, the vehicle event can be written in an application specific format and the activation context can be written in an application independent format.

In another embodiment, one or more activation contexts can be defined to include multiple related vehicle events. For example, one activation context can be defined to occur when a vehicle is low on fuel, another when the vehicle is low on oil, and another to indicate when a vehicle travels from one defined grid to another. These activation contexts (sent to vehicles) can be used by the vehicle response server to reply to a multitude of application submitted events. Application submitted events for the exemplary activation contexts can include events triggered when a vehicle using diesel gasoline is low on fuel (submitted by a first application), when a vehicle is low on fuel and needs a quart of oil (submitted by a second application), when a vehicle approaching a gas station is low on fuel (submitted by a third application), and other such occurrences submitted by any number of applications.

In step 615, when the vehicle event results in one or more activation context that is not being currently tracked, the vehicle response server can wirelessly convey the activation context to one or more vehicle response agents, each agent being located within a vehicle. In step 620, each vehicle response agent can analyze vehicle conditions to determine if conditions specified by the activation context have been satisfied. If not, the method can proceed to step 625, where additional sensor input can be received over time. The additional sensor input can represent an altered state for vehicle conditions. The method can loop from step 625 to step 620, where the vehicle response agent can analyze vehicle conditions in light of the altered vehicle state.

When the conditions for one or more activation events have been satisfied, the method can progress to step 630, where the vehicle response agent can convey a context event occurrence indication to the vehicle response server. The vehicle response agent can also convey one or more relevant vehicle values (such as fuel reading, vehicle location, and the like) to the vehicle response server when conveying the occurrence indication.

In step 635, the vehicle response server can adjust server variables and/or perform server actions to reflect the occurrence of the event. In step 640, the vehicle response server can determine whether any vehicle events submitted by registered applications have been triggered by the context event occurrence. In step 645, the vehicle response server can convey one or more electronic messages to one or more registered applications. Each electronic message can be tailored to the vehicle event of an associated application. Content within the electronic messages can also be tailored to the information privileges granted to the message receiving application. In step 650, each application receiving an electronic message can perform one or more context-dependent programmatic actions based upon the message content, where the context of programmatic action refers to a vehicle specific context.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for interacting with vehicles comprising:

a vehicle response server configured to manage communications between at least one vehicle and at least one application remotely located from the vehicle, wherein the application conveys a message to the vehicle response server that indicates a set of conditions for triggering at least one context-dependent programmatic action, and wherein the application automatically executes at least one context-dependent programmatic action based upon an event occurrence triggered by vehicle sensor input; and a vehicle response agent disposed in said at least one vehicle configured to receive an activation context that specifies conditions for the event occurrence, monitor for the event occurrence, and wirelessly convey an indication of the event occurrence to the vehicle response server, which results in the automatic execution of the at least one context-dependent programmatic action.

2. The system of claim 1, said vehicle response agent further comprising:

a context processor configured to translate said activation context into vehicle-specific conditions for the event occurrence;

a communication engine configured to wirelessly exchange digitally encoded information with the vehicle response server; and a sensor monitor configured to receive said vehicle sensor input and to correlate the vehicle sensor input to the vehicle specific conditions.

3. The system of claim 1, wherein the vehicle response server and the vehicle response agent utilize a vehicle response language that includes data types and functions specifically defined for obtaining and processing vehicle sensor input.

4. A method for obtaining contextual vehicle information comprising the steps of:

conveying a message from an application to a remote computing device, said message indicating an activation context from an application;

conveying the activation context from the remote computing device to an in-vehicle device, said activation context associated with at least one context-dependent programmatic action, wherein the in-vehicle device and the remote computing device are communicatively linked through a wireless network;

determining by the in-vehicle device an occurrence of a context event specified by the activation context;

responsive to the occurrence, conveying a context indication to the remote computing device, said context indication causing the context-dependent programmatic action to execute; and conveying a message from the remote computing device to the application, the message connoting the context indication to the application.

5. The method of claim 4, wherein the context indication includes at least one value obtained from a vehicle sensor of a vehicle containing the in-vehicle device.

6. The method of claim 5, wherein the at least one value is passed as a parameter to a software routine that performs the at least one context-dependent programmatic action.

7. The method of claim 5, wherein the vehicle is moving during the step of conveying of the activation context, the step of determining the occurrence, and the step of conveying the context indication.

8. The method of claim 7, wherein the vehicle sensor indicates at least one of a location, a speed, and a direction of travel for the vehicle.

9. The method of claim 7, wherein the vehicle sensor indicates at least one of an oil level, an engine temperature, a tank fuel level, and a wiper setting for the vehicle.

10. The method of claim 7, wherein the vehicle sensor indicates at least one of an odometer reading and a tachometer reading for the vehicle.

11. The method of claim 4, further comprising the steps of:

receiving by the remote computing device a message indicating an activation context from a different application; and conveying by the remote computing device a message connoting an context indication to the different application.

12. The method of claim 11, wherein the same activation context is indicated by the application and by the different application, and wherein the same context indication is connoted to the application and by the different application, and wherein a single activation context is conveyed from the remote computing device to the in-vehicle device, and wherein a single context indication is conveyed from the in-vehicle device to the remote computing device.

13. A method for obtaining contextual vehicle information comprising the steps of:

conveying an activation context from a remote computing device to an in-vehicle device, said activation context associated with at least one context-dependent programmatic action;

the in-vehicle device determining an occurrence of a context event specified by the activation context;

responsive to the occurrence, conveying a context indication to the remote computing device, said context indication causing the context-dependent programmatic action to execute, wherein the vehicle and the remote computing device are communicatively linked through a wireless network, wherein the context-dependent programmatic action generates an electronic message conveyed to the in-vehicle device; and presenting by the in-vehicle device content from the electronic message to a vehicle passenger.

14. The method of claim 4, wherein the step of conveying the activation context, the step of determining the occurrence, and the step of conveying the context indication utilize a vehicle response language.

15. The method of claim 14, wherein the vehicle response language includes defined data types for at least one of vehicle longitude, vehicle latitude, vehicle speed, engine oil level, engine temperature, engine tachometer, tank fuel level, and wiper setting.

16. A method for obtaining contextual vehicle information comprising the steps of:

conveying an activation context from a remote computing device to an in-vehicle device, said activation context associated with at least one context-dependent programmatic action;

the in-vehicle device determining an occurrence of a context event specified by the activation context; and responsive to the occurrence, conveying a context indication to the remote computing device, said context indication causing the context-dependent programmatic action to execute;

wherein the vehicle and the remote computing device are communicatively linked through a wireless network;

wherein the step of conveying the activation context, the step of determining the occurrence, and the step of conveying the context indication each utilize a vehicle response language;

wherein the vehicle response language includes a function that returns a value generated by a sensor indicating a value change that has been detected since the last time the in-vehicle device sent a value for the sensor to the remote computing device.

17. A machine-readable storage having stored thereon, a computer program having a plurality of code sections, said code sections executable by a machine for causing the machine to perform the steps of:

conveying a message from an application to a remote computing device, said message indicating an activation context from an application;

conveying the activation context from the remote computing device to an in-vehicle device, said activation context associated with at least one context-dependent programmatic action, wherein the in-vehicle device and the remote computing device are communicatively linked through a wireless network;

determining by the in-vehicle device an occurrence of a context event specified by the activation context;

responsive to the occurrence, conveying a context indication to the remote computing device, said context indication causing the context-dependent programmatic action to execute; and conveying a message from the remote computing device to the application, the message connoting the context indication to the application.

18. The machine-readable storage of claim 17, wherein the vehicle is moving during the step of conveying of the activation context, the step of determining the occurrence, and the step of conveying the context indication.

19. The machine-readable storage of claim 17, wherein the step of conveying the activation context, the step of determining the occurrence, and the step of conveying the context indication utilize a vehicle response language that includes data types and functions specifically defined for obtaining and processing vehicle sensor information.

* * * * *